UNITED STATES PATENT OFFICE.

JOHN P. WOODS BECKMAN, OF PARNASSUS, PENNSYLVANIA.

METHOD OF UTILIZING STEEL-SCRAP.

947,031.  Specification of Letters Patent.  Patented Jan. 18, 1910.

No Drawing.  Application filed January 27, 1908. Serial No. 412,899.

*To all whom it may concern:*

Be it known that I, JOHN PIERSON WOODS BECKMAN, of Parnassus, Westmoreland county, Pennsylvania, have invented a new and useful Method of Utilizing Steel-Scrap, of which the following is a full, clear, and exact description.

My invention relates to a novel method for utilizing steel scrap which is rich in silicon or other alloys, and is designed to provide an efficient and practical method whereby scrap of this character may be utilized without substantial loss in its alloy content by using for the purpose the excess heat of molten steel or molten steel alloys to melt the scrap. It has been customary heretofore to treat scrap of this character by melting it in a furnace in which its silicon or other alloy content is burned away and goes into slag and becomes waste product. By means of my improved method I am enabled to utilize substantially all of this alloy content in the scrap.

In accordance with my invention, I take the scrap containing silicon or other alloy content, and heat it in a closed vessel or furnace whose temperature is below the temperature required to fuse the scrap in such a manner as to prevent any substantial oxidation, bringing the scrap up to a white heat. I then add to the scrap molten steel which has been melted in a separate vessel or furnace and thus utilize the excess heat of this steel to melt the scrap which has been preheated to a point slightly below its melting point. In this manner I am able to utilize practically all of the alloy content of the scrap without loss and at a very slight additional cost. By the use of a furnace whose temperature is below the temperature required to fuse the scrap I am enabled to heat scrap of varying thickness to the same degree, thereby overcoming any loss of alloy contained in the small particle of the scrap, which would occur if the scrap were heated in a furnace whose temperature was above the temperature required to fuse the same, as the small particle would be fused before the large particles were heated throughout to the required temperature.

I claim:—

1. The herein described method of utilizing steel scrap, which is rich in silicon, which consists in preheating the scrap in a furnace whose temperature is below the fusing point of the scrap without substantial oxidation thereof, and adding thereto molten metal, and utilizing the excess heat of such metal to fuse the scrap; substantially as described.

2. The method of utilizing steel scrap, which consists in preheating scrap which is rich in silicon or other alloy content in a furnace whose temperature is below the fusing point of the scrap, and then pouring molten metal into the furnace containing the heated scrap and utilizing the excess heat of the molten metal to fuse the scrap; substantially as described.

3. The herein described method of utilizing the alloy content of steel scrap which is rich in silicon or other metalloid, which consists in preheating the scrap in a closed vessel or furnace in a furnace whose temperature is below the fusing point of the scrap, and then adding molten steel thereto and utilizing the excess heat of the molten metal to fuse the scrap; substantially as described.

4. The method which consists in preheating scrap which is rich in silicon or other metalloid in a furnace whose temperature is below the fusing point of the scrap, and then adding molten iron or steel to the preheated scrap, without removing it from the vessel in which it is heated, to thereby melt the same and thus preserve in the steel the metalloid content of the scrap; substantially as described.

In testimony whereof, I have hereunto set my hand.

JOHN P. WOODS BECKMAN.

Witnesses:
   H. M. CORWIN,
   GEO. H. PARMELEE.